United States Patent [19]

Mooney et al.

[11] 4,007,567
[45] Feb. 15, 1977

[54] TRUCK BODY ASSEMBLY

[75] Inventors: Edward L. Mooney; Kenneth L. Pritchard, both of Baltimore, Md.

[73] Assignee: Pritchard-King, Inc., Baltimore, Md.

[22] Filed: Feb. 13, 1975

[21] Appl. No.: 549,662

Related U.S. Application Data

[62] Division of Ser. No. 448,197, March 5, 1974, Pat. No. 3,882,592.

[52] U.S. Cl. .................... 52/262; 105/396; 296/28 M; 296/29
[51] Int. Cl.² ......................... B62D 23/00
[58] Field of Search ............ 52/66, 69, 71, 262; 296/28 M, 31 R, 31 P, 29; 105/396, 404, 409

[56] References Cited

UNITED STATES PATENTS

| | | | |
|---|---|---|---|
| 2,395,691 | 2/1946 | Smith | 52/69 |
| 2,489,670 | 11/1949 | Powell, Jr. | 296/28 M |
| 2,882,089 | 4/1959 | Vaszin | 296/28 M |
| 2,934,372 | 4/1960 | Jewell et al. | 105/409 X |
| 2,974,996 | 3/1961 | Bitterman et al. | 296/28 M |
| 2,993,728 | 7/1961 | Beran et al. | 296/28 M |
| 3,023,463 | 3/1962 | Bigelow, Jr. | 52/262 |
| 3,103,709 | 9/1963 | Bolt | 52/69 |
| 3,219,383 | 11/1965 | Nerem | 52/627 X |
| 3,252,730 | 5/1966 | Chieger et al. | 296/28 M |
| 3,288,516 | 11/1966 | Lewis | 52/71 X |
| 3,353,863 | 11/1967 | Koot | 52/262 X |
| 3,832,811 | 9/1974 | Briel | 52/69 |
| 3,834,575 | 9/1974 | Carr | 296/28 M |

FOREIGN PATENTS OR APPLICATIONS

| | | | |
|---|---|---|---|
| 1,127,915 | 9/1968 | United Kingdom | 296/31 P |

*Primary Examiner*—Leslie Braun
*Attorney, Agent, or Firm*—Karl W. Flocks

[57] ABSTRACT

Interfitting prefabricated parts of a truck body structure for attachment of rear and front wall assemblies, hooking a roof on the front wall and lowering it onto the rear wall, connecting on the side walls, utilizing a roof rail hooking leg attaching to front and side wall top caps, and interfitting corner posts and side wall edges.

2 Claims, 13 Drawing Figures

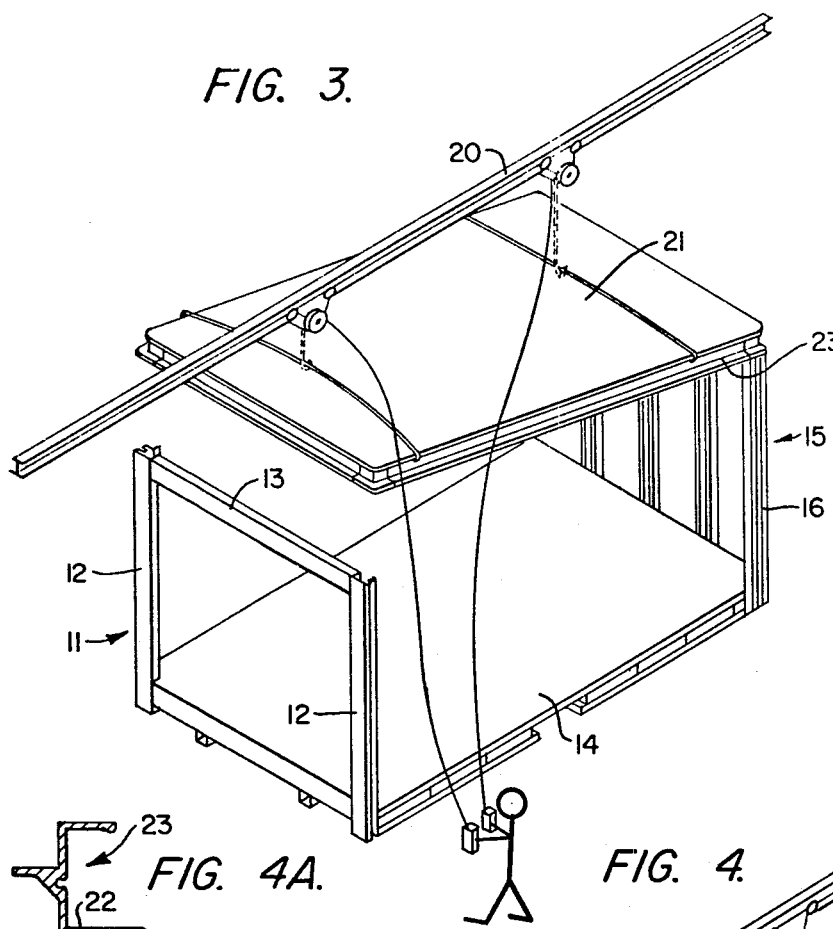
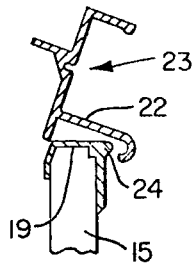
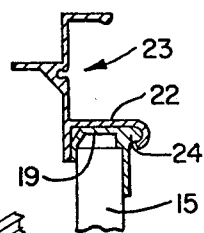
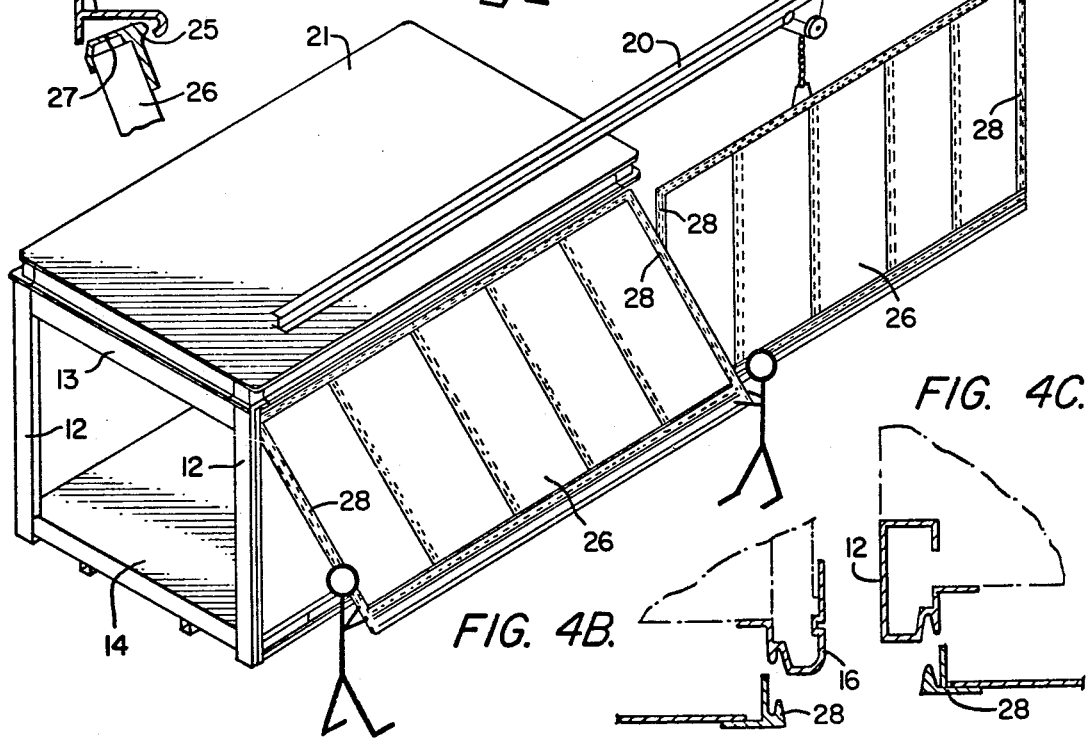
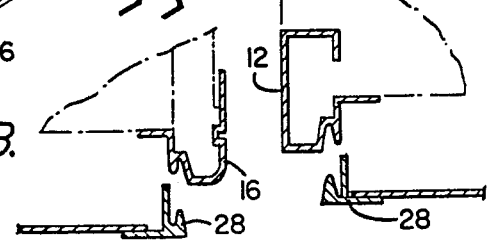

1

TRUCK BODY ASSEMBLY

This is a division, of application Ser. No. 448,197, filed Mar. 5, 1974 now U.S. Pat. No. 3,882,592.

BACKGROUND OF THE INVENTION

The present invention relates to assembly of truck bodies for a type of body such as on a dry freight van or a van such as may be adapted for refrigerated use, and to interfitting shaped parts which allow ease of fabrication.

Prior art means for assembling a truck body of such a van has usually followed the pattern of placing rear and front assemblies on an underframe assembly, clamping side walls to the underframe assembly, and then lowering a roof assembly onto the shell of front, rear, and sides. The shell walls would be fitted into roof rail openings. The shell must then be hand drilled along the roof rail, front corner posts, and rear corner posts for rivets and through posts for bolts with the work completed by riveting by a two man operation, a driver and a bucker.

SUMMARY OF THE INVENTION

The present invention seeks to speed up the assembly of the truck body through use of prefabricated parts wherein all punching and riveting is done previous to assembly and the workers remain at floor level during all steps of assembly.

The present invention allows faster movement of truck bodies along an assembly line without the need for a rivetor and helper on the assembly line where the final assembly takes place.

The present invention defines interfitting parts of roof rail, top post caps, corner posts, and side edges for quick assembly.

Basically in the method of assembly the front and rear frames are attached to an underframe assembly, a roof is hooked on and lowered onto the front and rear frames respectively, and side walls are then hung onto the roof so as to interfit with corner posts followed by attachment of sides to underframe by bolts and nuts through pre-located and pre-punched holes and pop riveting at corner posts.

The interfitting parts involve a roof rail with hooking means for hooking to a top post cap on a front (or rear assembly) and for hooking side walls thereto.

The interfitting parts also involve edges on side walls fitted into corner posts and shaped to receive and be connected by a pop rivet.

BRIEF DESCRIPTION OF THE DRAWINGS

The invention can best be understood by referring to the accompanying drawings in which:

FIGS. 1, 2, 3, 4, and 5 illustrate the steps in the method of the present invention for assembling a truck body;

FIGS. 3A and 3B are cross-sectioned views of the roof and front wall interfitted portions in raised and lowered positions of the roof respectively; FIG. 4A is a cross-sectioned view of the roof and side wall interfitted portions during the step of connection shown in FIG. 4;

FIGS. 4B and 4C are cross-sectioned views of interfitted portions of the side wall with the front and rear corner posts respectively in separated positions.

DESCRIPTION OF THE PREFERRED EMBODIMENT

Figure 1:
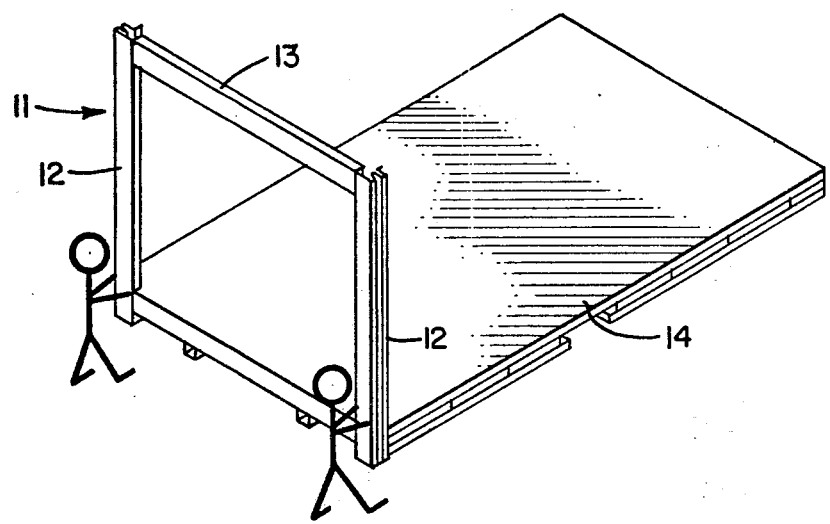

In the assembly of a truck body such as might be used for a refrigerated body, a rear frame sub-assembly 11 consisting of corner post 12, and header and gutter 13 are placed on underframe assembly 14 as shown in FIG. 1.

Figure 2:
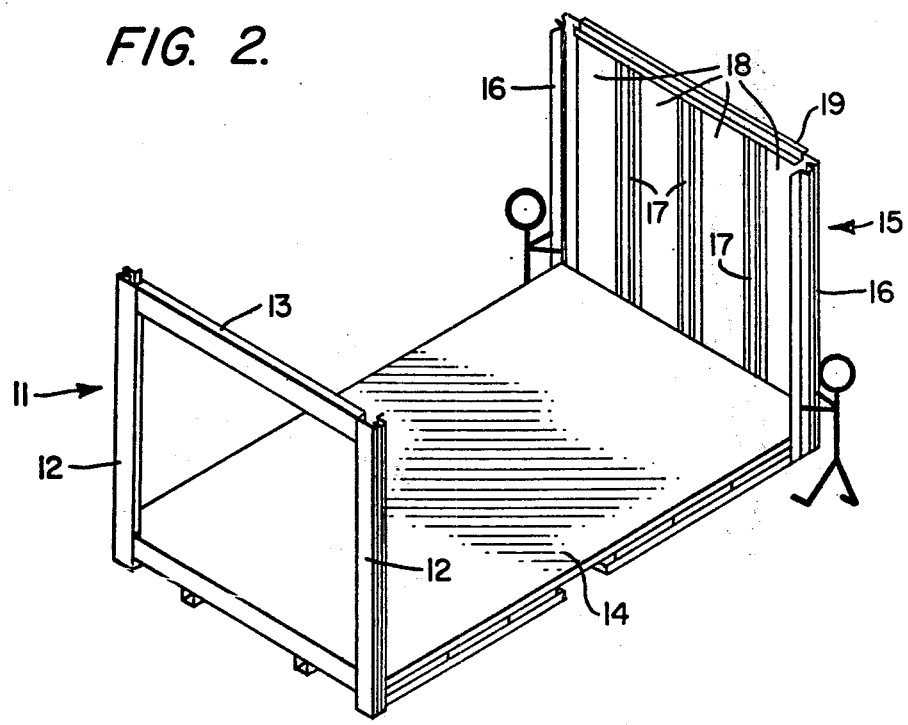

A front wall assembly 15 consisting of corner posts 16, vertical body posts 17, with panels 18 therebetween, and a panel cap 19 over the top is also placed on the underframe assembly 14 as shown in FIG. 2. Corner posts 16, body posts 17, panels 18, and panel cap 19 are previously riveted before this assembly.

Up to this point the assembly is not substantially different from the methods of the prior art.

In the next step in the present novel method of assembly a roof 21 which may be carried on an overhead travelling crane 20 is positioned over the assembly and lowered at an angle as depicted in FIG. 3. The roof 21 is hooked over front wall assembly 15 by mating hook leg 22 of roof rail 23 with bulb 24 of panel cap 19 of front wall asembly 15 as illustrated in raised and lowered positions in cross-section in FIGS. 3A and 3B, respectively.

Next, prefabricated sidewalls 26 are positioned beside the assembly by overhead travelling crane 20, and while held at an angle as illustrated in FIG. 4, sidewall top cap 27, is mated with hook leg 22 on the longitudinal side of roof rail 23 as illustrated in cross-section in FIG. 4A. The sidewall 26 is then lowered against the sides of the truck assembly, automatically mating sidewall corner posts 28 with front corner post 16 and rear corner post 12 on one side of the truck body. This is illustrated in plan cross-section views in FIGS. 4B, 5B and FIGS. 4C, 5C, respectively. In each case grooved and projecting portion of a sidewall corner post 28 fits into a complementary projecting and grooved portion of either a front or rear corner post, 16 or 12. This step takes place either consecutively or concurrently to each of sidewalls 26 on both sides of the truck body assembly. As noted all steps can be done with workers at floor level and therefore time lost by workers climbing alongside or on the truck body is reduced or completely eliminated.

Figure 5:
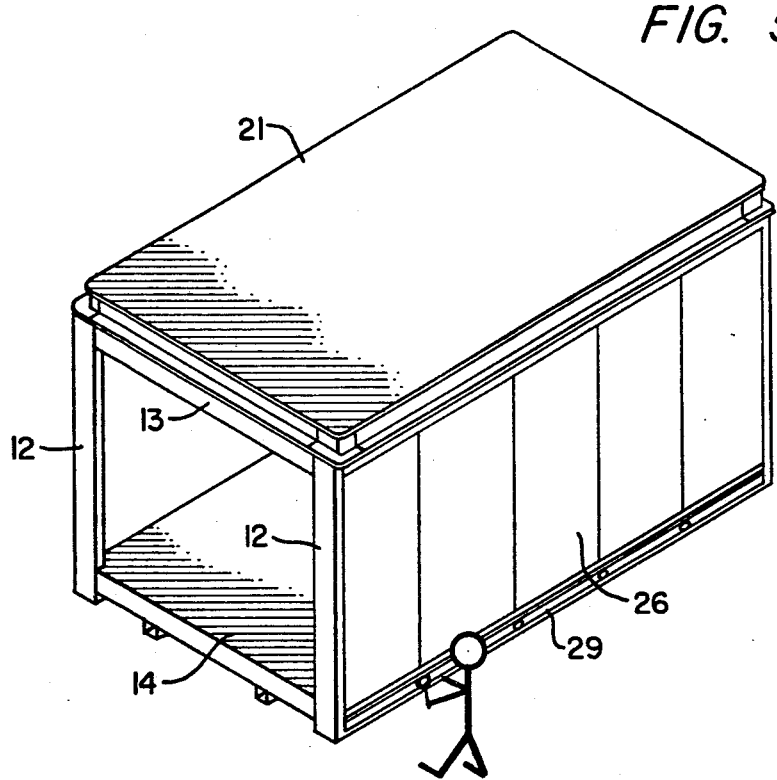
Figure 5C:
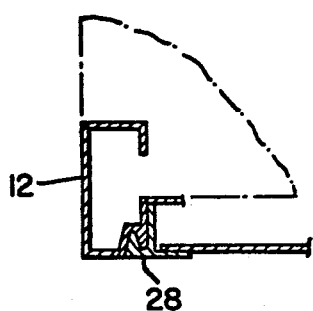
FIGS. 5A, 5B and 5C are cross-sectioned views of interfitted side and underframe and of the interfitted portions shown in FIGS. 4B and 4C, respectively, fitted together.
Figure 5B:
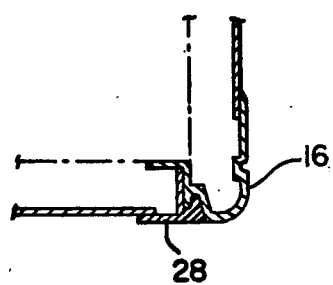
Figure 5A:
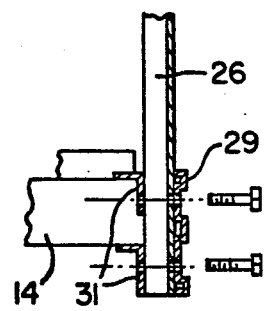

Front, rear, and side corner posts all have pre-punched holes aligned for receiving pop-rivets therethrough as designated in FIGS. 5B and 5C, respectively. Pre-punched holes as shown in FIG. 5A are aligned in rub rail 29 which extends along the bottom edge of sidewall 26 and in side angles 31 on underframe assembly 14. As a last step shown in the present method, FIG. 5 illustrates the one-man operation of attaching the sidewalls 26 to underframe assembly 14 through pre-located and pre-punched holes with bolts and nuts and the aforementioned pop-riveting to secure the shell.

The method of truck body assembly described above is facilitated through use of interfitting parts which connect as illustrated in the more detailed cross-sectioned views.

One of these parts is roof rail 23 having hook leg 22 which extends along the front and sides of the roof. Alternatively it could have the hook leg 22 construction on the rear instead of the front but not necessarily on both the front and the rear. Depending of course on whether the hook leg 22 was on the front or rear, the complementary shaped panel cap 19 would have to be connected on the corresponding front or rear assembly and the roof sloped during assembly toward that appropriate end. The remaining side of the roof 21 without hook leg 22 would probably have at least the inner vertical flange and a horizontal flange to complete the closure.

Additionally the roof rail 23 and its hook leg 22 facilitate the assembly of sidewalls 26 to the truck body as shown in FIGS. 4 and 4A. Complementary sidewall top cap 27 with bulb 25 allows insertion of sidewalls 26 to hang them from roof 21. Interfitting groove and projection shaped sidewall corner posts 28 which fit directly into groove and projection complementary shaped front and rear corner posts 16 and 12 allow completion of the simple and economical type of assembly of the sidewalls 26 onto the truck body.

It will be obvious to those skilled in the art that various changes may be made without departing from the scope of the invention and the invention is not to be considered limited to what is shown in the drawings and described in the specification.

What is claimed is:

1. The prefabricated parts used in assembling a truck body comprising
   an underframe assembly;
   first and second end wall assemblies on opposite ends of said underframe assembly;
   a roof on said end wall assemblies having side edges and first and second end edges;
   sidewall assemblies attached to said roof on opposite sides of said roof with vertical edges mating with vertical edges of said end wall assemblies;
   said roof having a rail along each of its edges with hooking means on both side edge rails, and means to hook said rail along said first end edge to said first end wall, and with a hookless cooperating means along said rail on said second end edge and said second end wall, with said hooking means of said side edge rails for attaching said sidewall assemblies to said roof by tilting said roof and sidewall assemblies in relation to each other to engage to each other;
   said sidewall assemblies each having a complementary hooking means along its top edge to attach said side wall assemblies to said roof by attachment to said hooking means of said side edge roof rails,
   said hooking means of said side edge roof rails having a horizontal portion extending outward from said roof, a hook on the outside edge of said horizontal portion, and a depending flange on the inside edge of said horizontal portion,
   said complementary hooking means having a top cap complementary with said horizontal portion, a bulbous projection extending into said hook, and a slanted portion means opposite said bulbous projection for aiding the fitting of said complementary hooking means into said hooking means.

2. The prefabricated parts of claim 1, further characterized by
   said mating edges on vertical edges of said sidewall assemblies and vertical edges of said end wall assemblies having complementary grooved and projecting surfaces.

* * * * *